United States Patent
Yamaguchi et al.

(10) Patent No.: US 6,491,979 B1
(45) Date of Patent: Dec. 10, 2002

(54) FLUORINE-CONTAINING SURFACE TREATMENT COMPOSITION

(75) Inventors: Fumihiko Yamaguchi, Settsu (JP); Yasushi Nakamae, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/743,714

(22) PCT Filed: Jul. 14, 1999

(86) PCT No.: PCT/JP99/03803

§ 371 (c)(1),
(2), (4) Date: Jan. 16, 2001

(87) PCT Pub. No.: WO00/04109

PCT Pub. Date: Jan. 27, 2000

(30) Foreign Application Priority Data

Jul. 17, 1998 (JP) .......................................... 10-202449

(51) Int. Cl.⁷ ................................................. B05D 3/02
(52) U.S. Cl. ..................................................... 427/385.5
(58) Field of Search ..................... 427/385.5; 106/38.22

(56) References Cited

U.S. PATENT DOCUMENTS

| | | | |
|---|---|---|---|
| 4,308,063 A | | 12/1981 | Horiuchi et al. |
| 5,814,595 A | * | 9/1998 | Flynn et al. ................. 106/311 |
| 5,827,812 A | * | 10/1998 | Flynn et al. ................. 106/311 |

FOREIGN PATENT DOCUMENTS

| | | |
|---|---|---|
| EP | 0 148 482 | 7/1985 |
| EP | 0 705 671 | 4/1996 |
| JP | 2-248827 | 10/1988 |
| JP | 1-291908 | 11/1989 |
| JP | 2-115293 | 4/1990 |
| WO | WO 95/00307 | 1/1995 |
| WO | WO 96/22356 | 7/1996 |
| WO | WO 96/36688 | 11/1996 |
| WO | WO 96/36689 | * 11/1996 |
| WO | WO 98/42774 | * 10/1998 |
| WO | WO 98/50517 | * 11/1998 |
| WO | WO 99/41428 | * 8/1999 |

* cited by examiner

Primary Examiner—Erma Cameron
(74) Attorney, Agent, or Firm—Larson & Taylor PLC

(57) ABSTRACT

The present invention provides a fluorine-containing surface treatment composition comprising a surface treatment component and a solvent component wherein the solvent component contains 5 wt. % or more of a chlorine-free, non-flammable halogen-containing solvent which has an ozone depletion potential (ODP) of 0.03 or less, a 100-year integrated global warming potential (GWP) value of 500 or less, and a KB value of 5 or more. The fluorine-containing surface treatment composition of the present invention is a surface treatment agent that is extremely unlikely to cause ozone layer depletion and global warming, has excellent storage stability and excellent performance characteristics as a surface treatment agent and is highly safe due to the non-flammability or flame retardancy thereof.

15 Claims, No Drawings

FLUORINE-CONTAINING SURFACE TREATMENT COMPOSITION

TECHNICAL FIELD

The present invention relates to a fluorine-containing surface treatment composition, a product to be used for surface treatment comprising the surface treatment composition, and a process for surface treatment.

BACKGROUND ART

Fluorine-containing surface treatment compositions are applied to various substrate surfaces to impart thereto various properties characteristic of fluorine-containing compounds, such as low surface energy, non-adhesion (mold releasability), water repellency and oil repellency. For example, with use of metal or other items as substrates, the fluorine-containing surface treatment compositions find applications as mold release agents, resin adhesion inhibitors, flux barrier agents, anti-adhesion agents, antiblocking agents, rear surface treatment agents, antitacking agents, electric wire stripping agents and lubricants.

Chlorofluorocarbons have been widely used as solvents for solvent-based fluorine-containing surface treatment compositions because the chlorofluorocarbons are less toxic, nonflammable and chemically stable. Particularly CFC-113, which has a moderate boiling point, has been widely used. However, ozone layer depletion by specific chlorofluorocarbons such as CFC-113 became a problem and production of such chlorofluorocarbons has been discontinued on a worldwide scale.

Under such circumstances, much study was carried out on solvents which may replace the chlorofluorocarbons. Since it was considered that hydrochlorofluorocarbons could be a replacement, various fluorine-containing surface treatment compositions containing HCFC-141b as a solvent were developed. Although hydrochlorofluorocarbons have low ozone depletion potential (ODP), it does not mean that the hydrochlorofluorocarbons do not cause any ozone depletion. For this reason, reduction or total abolition of hydrochlorofluorocarbons has been decided.

In such circumstances, further research was carried out and fluorine-containing surface treatment compositions containing solvents such as perfluorocarbon (PFC) and perfluoroether (PFE) were developed (e.g., "DAIFREE GF-6400" manufactured by Daikin Industries, Ltd., Japanese Unexamined Patent Publication No. 109158/1997, etc.). However, perfluoro-solvents were found to cause an environmental problem of greatly affecting global warming, although the perfluoro-solvents do not cause ozone layer depletion. For this reason, limitation on perfluoro compound emissions has been decided, and it is currently difficult to use such perfluoro-solvents.

DISCLOSURE OF THE INVENTION

A primary object of the present invention is to provide a fluorine-containing surface treatment composition that has excellent storage stability and excellent performance characteristics as a surface treatment agent and is highly safe due to the non-flammability or flame retardancy thereof, the composition causing hardly any ozone layer depletion and global warming.

The inventors of the present invention carried out intensive research in view of the above problems and finally found the following. The object can be achieved with a fluorine-containing surface treatment composition comprising a fluorine-containing surface treatment component and a solvent component, wherein the solvent component contains 5 wt. % or more of a chlorine-free, non-flammable halogen-containing solvent which has an ozone depletion potential (ODP) of 0.03 or less, a 100-year integrated global warming potential (GWP) value of 500 or less, and a KB value of 5 or more. The present invention has been accomplished based on this finding.

The present invention provides the following fluorine-containing surface treatment composition, product to be used for surface treatment comprising the surface treatment composition, and process for surface treatment.

1. A fluorine-containing surface treatment composition comprising a surface treatment component and a solvent component, wherein the solvent component contains 5 wt. % or more of a chlorine-free, non-flammable halogen-containing solvent which has an ozone depletion potential (ODP) of 0.03 or less, a 100-year integrated global warming potential (GWP) value of 500 or less, and a KB value of 5 or more, the composition being used for purposes other than a water-repellent and an oil-repellent.
2. The fluorine-containing surface treatment composition according to item 1 wherein the halogen-containing solvent has a boiling point of 0° C. to 150° C.
3. The fluorine-containing surface treatment composition according to item 1 or 2 wherein the surface treatment component comprises at least one species selected from:
   (1) phosphorus-containing compounds having at least one fluorine-containing group selected from polyfluoroalkyl groups and polyfluoroalkenyl groups;
   (2) highly fluorinated organic compounds; and
   (3) polymers prepared using as a monomer component a compound having at least one fluorine-containing group selected from polyfluoroalkyl groups and polyfluoroalkenyl groups.
4. The fluorine-containing surface treatment composition according to item 1 or 2 wherein
   the surface treatment component contains 5 wt. % or more of at least one component selected from
   (1) phosphorus-containing compounds having at least one fluorine-containing group selected from polyfluoroalkyl groups and polyfluoroalkenyl groups and
   (2) highly fluorinated organic compounds, and
   the solvent component contains 50 wt. % or more of hydrofluoroether.
5. The fluorine-containing surface treatment composition according to item 4 wherein the surface treatment component comprises:
   at least one component selected from
   (1) phosphorus-containing compounds having at least one fluorine-containing group selected from polyfluoroalkyl groups and polyfluoroalkenyl groups and
   (2) highly fluorinated organic compounds; and
   at least one component selected from (i) silicone compounds and (ii) waxes.
6. The fluorine-containing surface treatment composition according to item 5 wherein the solvent component comprises hydrofluoroether and at least one solvent selected from aromatic solvents, petroleum solvents, ketone solvents and bromine-containing solvents.
7. The fluorine-containing surface treatment composition according to item 6 wherein
   the surface treatment component contains 30–95 wt. % of at least one component selected from (1) phosphorus-containing compounds having at least one fluorine-containing group selected from polyfluoroalkyl groups and polyfluoroalkenyl groups and (2) highly fluorinated organic compounds and 70–5 wt. % of at least one component selected from (i) silicone compounds and (ii) waxes; and the solvent component contains 50–90 wt. % of hydrofluoroether and 10–50 wt. % of at least one solvent selected from aromatic solvents, petroleum solvents, ketone solvents and bromine-containing solvents.

8. The fluorine-containing surface treatment composition according to item 1 or 2 wherein the surface treatment component contains 5 wt. % or more of (3) a polymer prepared using as a monomer component a compound having at least one fluorine-containing group selected from polyfluoroalkyl groups and polyfluoroalkenyl groups; and the solvent component contains 50 wt. % or more of a bromine-containing solvent.

9. The surface treatment composition according to item 8 wherein the surface treatment component comprises:

(3) a polymer prepared using as a monomer component a compound having at least one fluorine-containing group selected from polyfluoroalkyl groups and polyfluoroalkenyl groups; and at least one component selected from (2) highly fluorinated organic compounds, (i) silicone compounds and (ii) waxes.

10. The surface treatment composition according to item 9 wherein the surface treatment component contains:

30–95 wt. % of (3) a polymer prepared using as a monomer component a compound having at least one fluorine-containing group selected from polyfluoroalkyl groups and polyfluoroalkenyl groups; and 70–5 wt. % of at least one component selected from (2) highly fluorinated organic compounds, (i) silicone compounds and (ii) waxes.

11. The surface treatment composition according to item 8 wherein the bromine-containing solvent is a $C_{1-3}$ halogenated hydrocarbon having at least one bromine atom.

12. The surface treatment composition according to item 8 wherein the bromine-containing solvent is bromopropane.

13. The surface treatment composition according to item 8 wherein (3) the polymer prepared using as a monomer component a compound having at least one fluorine-containing group selected from polyfluoroalkyl groups and polyfluoroalkenyl groups is a copolymer of at least one fluorine-containing monomer selected from polyfluoroalkyl-containing (meth)acrylic esters, polyfluoroalkenyl-containing (meth)acrylic esters, polyfluoroalkyl-containing vinyl compounds and polyfluoroalkenyl-containing vinyl compounds, and another monomer copolymerizable therewith, the proportion of the fluorine-containing monomer being 20–95 parts by weight, based on 100 parts by weight of the total monomer component.

14. The surface treatment composition according to item 8 wherein (3) the polymer prepared using as a monomer component a compound having at least one fluorine-containing group selected from polyfluoroalkyl groups and polyfluoroalkenyl groups is a polymer of at least one fluorine-containing monomer selected from polyfluoroalkyl-containing epoxy monomers and polyfluoroalkenyl-containing epoxy monomers, or a copolymer of the fluorine-containing monomer and another monomer copolymerizable therewith, the proportion of the fluorine-containing monomer being 20–100 parts by weight, based on 100 parts by weight of the total monomer component.

15. The fluorine-containing surface treatment composition according to item 5 which is used as a mold release agent, an electric wire stripping agent or a lubricant.

16. The fluorine-containing surface treatment composition according to item 9 which is used as a mold release agent, an electric wire stripping agent or a lubricant.

17. A solvent for a fluorine-containing surface treatment composition used for purposes other than a water-repellent and an oil-repellent, which comprises a chlorine-free, non-flammable halogen-containing solvent having an ozone depletion potential (ODP) of 0.03 or less, a 100-year integrated global warming potential (GWP) value of 500 or less, and a KB value of 5 or more.

18. A product to be used for surface treatment comprising a container having a mechanism for ejecting a liquid from the container, the container containing the surface treatment composition according to item 1.

19. The product according to item 18 wherein the container is an aerosol container.

20. A surface treated article obtained by surface-treating an article with the surface treatment composition according to item 1.

21. A process for surface treatment of an article to be treated, which comprises treating the article with the surface treatment composition according to item 1, followed by drying.

According to the fluorine-containing surface treatment composition of the present invention, it is essential to use as a solvent component a chlorine-free, non-flammable halogen-containing solvent which has an ozone depletion potential (ODP) of 0.03 or less, a 100-year integrated global warming potential (GWP) value of 500 or less, and a KB value of 5 or more. Use of such a solvent provides a fluorine-containing surface treatment composition with high safety and good storage stability, the composition being extremely unlikely to cause ozone layer depletion and global warming.

In the above definition, the global warming potential (GWP) value is a cumulative total over a period of 100 years, based on the GWP of carbon dioxide gas calculated as 1. The KB value is used for showing dissolving capability of diluents in lacquer and paint industries. The KB value indicates how many cubic centimeters of a diluent is necessary to cause kauri gum to precipitate at 25° C. using 20 g of a standard solution containing kauri gum in butanol (American Gum Importor's Inc.). The higher the value is, the higher the dissolving capability is.

It is preferable that the halogen-containing solvent have a boiling point of about 0° C. to about 150° C., more preferably about 20° C. to about 100° C., further more preferably about 40° C. to about 80° C. A solvent with a boiling point in the above-mentioned range is easy to handle and provides a moderate drying speed of the surface treated article, thus being advantageous in ease of use.

Examples of chlorine-free, non-flammable halogen-containing solvents having an ozone depletion potential (ODP) of 0.03 or less, a global warming potential (100-year integrated GWP value) of 500 or less, and a KB value of 5 or more and having a boiling point of 0° C. to 150° C. include 1-bromopropane (boiling point: 71° C.), 2-bromopropane (boiling point: 59° C.–60° C.), 1,2-dibromopropane (boiling point: 140° C.–142° C.), 1-bromo-2-fluoroethane (boiling point: 71° C.–72° C.), 1-bromo-3-fluoropropane (boiling point: 99° C.–101° C.), 1,2-dibromofluoroethane (boiling point: 122.5° C.), 1,2- dibromo-1,1-difluoroethane (boiling point: 92° C.–93° C.), dibromomethane (boiling point: 97° C.) and like bromine-containing solvents; nanofluorobutyl-methyl ether (boiling point: 60° C., product name: HFE-7100 (manufactured by 3M)), nanofluorobutyl-ethyl ether (boiling point: 78° C., product name: HFE-7200 (manufactured by 3M)), pentafluoroethyl-methyl ether (boiling point: 5.6t), heptafluoropropyl-methyl ether (boiling point: 34.2° C.), heptafluoroisopropyl-methyl ether (boiling point: 29.4° C.) and like hydrofluoroethers. Particularly preferred in view of commercial availability, safety and other physical properties are 1-bromopropane (boiling point: 71° C.; ozone depletion potential (ODP): 0.021; global warming potential (100-year integrated GWP value): about 0.3; KB value: 125; nonflammable); nanofluorobutyl-methyl ether (boiling point: 60° C.; ozone depletion potential (ODP): 0; global warming potential (100-year integrated GWP value): 500; KB value: 10; nonflammable; product name: HFE-7100 (manufactured by 3M)); nanofluorobutyl-ethyl ether (boiling point: 78° C.; ozone depletion potential (ODP): 0; global warming potential (100-year integrated GWP value): 100; KB value: 10; nonflammable; product name: HFE-7200 (manufactured by 3M)); and the like.

The halogen-containing solvents may be used singly or in combination of two or more.

The solvent component may include, in addition to the above-mentioned halogen-containing solvents, other solvents as cosolvents. Examples of useful cosolvents include petroleum solvents such as n-hexane, n-heptane, n-decane, isooctane, petroleum ether and gasoline for industrial use; ester solvents such as ethyl acetate and butyl acetate; ketone solvents such as acetone and methylethylketone; alcohol solvents such as ethanol and isopropanol; aromatic solvents such as toluene and xylene; glycol (ether) solvents such as ethylene glycol, propylene glycol and propylene glycol monomethyl ether. The solvents may be used singly or in combination of two or more.

According to the composition of the invention, the proportion of the halogen-containing solvent in the solvent component is 5 wt. % or more, preferably 10 wt. % or more, further more preferably 20 wt. % or more, based on 100 wt. % of the total solvent component. The upper limit of the halogen-containing solvent can be 100 wt. %. Use of less than 5 wt. % of the halogen-containing solvent is unsuitable because it tends to be difficult to retain good storage stability while maintaining essential properties required of a fluorine-containing surface treatment composition, such as low surface energy, non-adhesion (mold releasability), water repellency and oil repellency, thus failing to achieve the object of the present invention.

The surface treatment component used as an active ingredient in the fluorine-containing surface treatment composition of the invention may be selected from components of various known fluorine-containing surface treatment agents, which may be used singly or in combination in accordance with the intended use.

According to the present invention, it is particularly preferable to use a surface treatment component comprising at least one component selected from:

(1) phosphorus-containing compounds having at least one fluorine-containing group selected from polyfluoroalkyl groups and polyfluoroalkenyl groups;
(2) highly fluorinated organic compounds; and
(3) polymers prepared using as a monomer component a compound having at least one fluorine-containing group selected from polyfluoroalkyl groups and polyfluoroalkenyl groups.

The surface treatment component of the invention may comprise, in addition to at least one surface treatment component selected from the components (1) to (3), other surface treatment components such as (i) silicone compounds and (ii) waxes, in accordance with the intended use. When the surface treatment component contains other components in addition to at least one of the components (1) to (3), the proportion of at least one of the components (1) to (3) is preferably 5 wt. % or more, more preferably 20 wt. % or more, based on 100 wt. % of the total surface treatment component. When the surface treatment component comprises 5 wt. % or more of at least one of the components (1) to (3), the composition has improved stability of performance characteristics such as low surface energy, non-adhesion (mold releasability), water repellency and oil repellency.

The total surface treatment component is preferably about 0.3 to about 30 wt. %, based on 100 wt. % of the total surface treatment composition of the present invention.

According to the present invention, when the surface treatment component comprises at least one component selected from (1) phosphorus-containing compounds having at least one fluorine-containing group selected from polyfluoroalkyl groups and polyfluoroalkenyl groups and (2) highly fluorinated organic compounds, it is particularly preferable to use a solvent component containing a hydrofluoroether, among the aforementioned halogen-containing solvents. Use of such a solvent component improves the solubility of the surface treatment component whereby uniform coating film is formed with ease, thus achieving improved performance characteristics such as low surface energy, non-adhesion (mold releasability), water repellency and oil repellency and also whereby good storage stability is provided. In this case, the hydrofluoroether is preferably used in a proportion of 50 wt. % or more, more preferably 70 wt. % or more, based on the total solvent.

When the composition comprises, as a surface treatment component, at least one component selected from (1) phosphorus-containing compounds having at least one fluorine-containing group selected from polyfluoroalkyl groups and polyfluoroalkenyl groups and (2) highly fluorinated organic compounds, and the composition is used as a mold release agent, an electric wire stripping agent, a lubricant or the like, it is preferable that the composition further comprise at least one surface treatment component selected from (i) silicone compounds and (ii) waxes. In this case, the surface treatment component preferably contains about 30–95 wt. % of at least one component selected from (1) phosphorus-containing compounds having at least one fluorine-containing group selected from polyfluoroalkyl groups and polyfluoroalkenyl groups and (2) highly fluorinated organic compounds, and about 70–5 wt. % of at least one component selected from (i) silicone compounds and (ii) waxes, based on the total surface treatment component. When the composition contains the components in such proportions, the composition has excellent performance characteristics such as low surface energy, non-adhesion (mold releasability), water repellency and oil repellency and also has excellent properties such as separability in the coating film, peelability and slipperiness, thus being suitable for use as mold release agents, electric wire stripping agents, lubricants and the like.

When the composition comprising at least one component selected from (i) silicone compounds and (ii) waxes contains hydrofluoroether as the only solvent component, the silicone compounds, waxes or other components may not be sufficiently dissolved. In this case, by using, in addition to the hydrofluoroether, at least one cosolvent selected from the aforementioned aromatic solvents (e.g., toluene, xylene), petroleum solvents, ketone solvents and bromine-containing solvents, improvement in solubility, stability of performance characteristics and storage stability can be achieved. The cosolvent is preferably used in a proportion of about 10–50 wt. %, based on the total solvent.

When the surface treatment component comprises (3) a polymer prepared using as a monomer component a compound having at least one fluorine-containing group selected from polyfluoroalkyl groups and polyfluoroalkenyl groups, it is preferable to use a solvent component containing a bromine-containing solvent, among the aforementioned halogen-containing solvents. Use of such a solvent component improves the solubility of the surface treatment component, whereby uniform coating film is formed with ease, thus achieving stability of performance characteristics such as low surface energy, non-adhesion (mold releasability), water repellency and oil repellency and also whereby good storage stability is provided. In this case, the bromine-containing solvent is preferably used in a proportion of 50 wt. % or more, more preferably 70 wt. % or more, based on the total solvent.

Preferred examples of bromine-containing solvents are $C_{1-3}$ halogenated hydrocarbons having at least one bromine atom. Especially preferred are bromopropanes such as 1-bromopropane, 2-bromopropane and 1,2-dibromopropane. Use of such a solvent particularly provides improved stability of performance characteristics such as low surface energy, non-adhesion (mold releasability), water repellency and oil repellency due to the formation of uniform coating film and also provides especially good storage stability.

When the composition contains, as a surface treatment component, (3) a polymer prepared using as a monomer component a compound having at least one fluorine-containing group selected from polyfluoroalkyl groups and polyfluoroalkenyl groups, and the composition is used as a mold release agent, an electric wire stripping agent, a lubricant or the like, it is preferable to further contain at least one surface treatment component selected from (2) highly fluorinated organic compounds, (i) silicone compounds and (ii) waxes. In this case, the surface treatment component preferably contains about 30–95 wt. % of (3) a polymer prepared using as a monomer component a compound having at least one fluorine-containing group selected from polyfluoroalkyl groups and polyfluoroalkenyl groups; and about 70–5 wt. % of at least one component selected from (2) highly fluorinated organic compounds, (i) silicone compounds and (ii) waxes, based on the total surface treatment component. When the composition contains the components in such proportions, the composition has excellent performance characteristics such as low surface energy, non-adhesion (mold releasability), water repellency and oil repellency and also has excellent properties such as separability in the coating film, peelability and slipperiness, thus being suitable for use as mold release agents, electric wire stripping agents and lubricants.

The surface treatment component in the composition of the present invention will be described below in more detail.

(1) Phosphorus-containing Compound Having at Least One Fluorine-containing Group Selected from Polyfluoroalkyl Groups and Polyfluoroalkenyl Groups The terms "polyfluoroalkyl" and "polyfluoroalkenyl" are used herein to refer to alkyl groups containing at least two fluorine atoms, and alkenyl groups containing at least two fluorine atoms, respectively. Preferably, each of the alkyl group and alkenyl group is a straight or branched chain group having 3 to 21 carbon atoms.

Examples of phosphorus-containing compounds include phosphoric esters, phosphonic acid derivatives, phosphinic acid derivatives and salts thereof. The compounds may be used singly or in combination of two or more.

The above-mentioned compounds will be described below.

(a) Examples of phosphoric esters or salts thereof include compounds represented by the following formula:

(1)

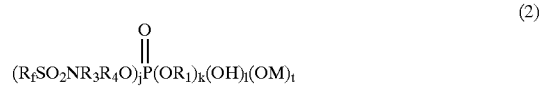

(2)

wherein Rf is a $C_{3-21}$ straight or branched chain polyfluoroalkyl or polyfluoroalkenyl group, M is an alkali metal atom (e.g., sodium or potassium), an ammonium group or a substituted ammonium (substituted by, for example, a $C_{1-5}$ alkyl group or a $C_{1-5}$ alkoxy group), $R_1$ is a $C_{1-5}$ alkyl group, $R_2$ is a $C_{1-10}$ alkylene group or $-CH_2CH(OR_3)CH_2-$ wherein $R_3$ is a hydrogen atom or a $C_{1-10}$ alkyl group, j is 1, 2 or 3, l is 2, 1 or 0 and is less than or equal to (3−j), k is 2, 1 or 0 and is less than or equal to 3−(j+l), t is 3−(J+l+k), and $R_4$ is a $C_{1-10}$ alkylene group.

Specific examples of the compounds of formulas (1) to (2) are shown below.

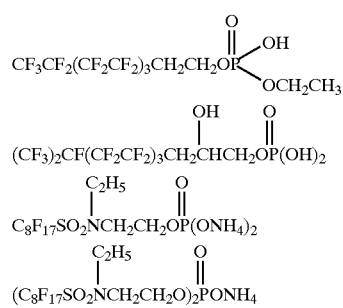

(b) Examples of phosphonic acid derivatives and salts thereof include compounds represented by the following formulas:

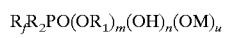

wherein Rf, $R_2$, $R_1$ and M are as defined above, m is 2, 1 or 0, n is 2, 1 or 0 and is less than or equal to (2−m), and u is 2−(m+n).

Specific examples of the compounds of formulas (3) to (4) are shown below.

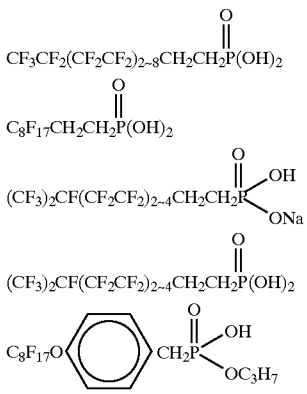

(c) Examples of phosphinic acid derivatives and salts thereof include compounds represented by the following formulas:

$$(R_fR_2)_p(H)_qP(OR_1)_r(OH)_s(OM)_v \quad (5)$$

wherein Rf, $R_2$, $R_1$ and M are as defined above,
p is 1 or 0,
q is 2–p,
s is 1 or 0
r is 1 or 0 and is less than or equal to (1–r), and
v is 1–(s+r).

Specific examples of the compounds of formulas (5) to (6) are shown below.

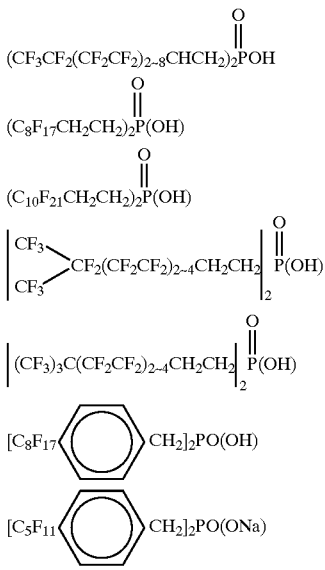

(2) Highly Fluorinated Organic Compound:

The highly fluorinated organic compound includes, for example, fluorine-containing oils, fluoroolefin telomers, and fluoroalkanes. Examples of fluorine-containing oils include fluoropolyethers, fluorochloro polyethers and like fluorine-containing polyether oils, fluorochloroolefin telomers, fluoroalkanes and the like. The compounds may be used singly or in combination of two or more.

The highly fluorinated organic compound may be liquid or solid. The highly fluorinated organic compound preferably has a boiling point of 180° C. or higher, more preferably 200° C. or higher.

Highly fluorinated organic compounds are known. Commercially available are Demnum (manufactured by Daikin Industries, Ltd.), Krytox (manufactured by Du Pont), Fomblin (manufactured by Mont Edison), Akulan (manufactured by Allied Corporation) and the like.

The highly fluorinated organic compounds will be described below in more detail.

I. Fluoropolyethers and fluorochloro polyethers include, for example, the following compounds (a) to (f).

(a) A polymer of 2,2,3,3-tetrafluorooxetane whose main portion (portion except for terminal groups) is composed of 2–200 repeating units represented by —$CH_2CF_2CF_2O$— (this polymer is described in Japanese Unexamined Patent Publication No. 137928/1985; hereinafter referred to as polymer (1)).

Specific examples thereof include:
a polymer comprising repeating units represented by —$CH_2CF_2CF_2O$— and having a number average molecular weight of $1.5\times10^4$;
a mixture of $C_3F_7OCF(CF_3)CF_2O(CH_2CF_2CF_2O)_p$ $CH_2CF_2COF$ (wherein p is an integer of 1 to 10);
a mixture of $F(CH_2CF_2CF_2O)_qCH_2CF_2COOCH_3$ (wherein q is an integer of 0 to 9);
a polymer comprising repeating units represented by —$CH_2CF_2CF_2O$— and having a number average molecular weight of $1.0\times10^4$;
a mixture of $I(CH_2CF_2CF_2O)_rCH_2CF_2COOCH_3$ (wherein r is an integer of 0 to 5);
a mixture of $CF_3CF_2CF_2O(CH_2CF_2CF_2O)_n$ $CH_2CF_2COOCH_3$ (wherein n is an integer of 1 to 8);
a mixture of $F(CH_2CF_2CF_2O)_m(CF(CF_3)CF_2O)_nCF(CF_3)$ $COOCH_3$ (wherein m is an integer of 2 to 9 and n is an integer of 0 to 3);
a mixture of $(CF_3)_2CFO(CH_2CF_2O)_nCH_2CF_2COOCH_3$ (wherein n is an integer of 1 to 8); and
a mixture of $C_3F_7OCFCF_2O(CH_2CF_2CF_2O)_pCH_2CF_3$ (wherein p is an integer of 1 to 10).

(b) A polymer obtained by substituting part or all of the hydrogen atoms in the polymer (1) with fluorine atoms, wherein the main portion of the polymer (portion except for terminal groups) comprises repeating units represented by —$CF_2CF_2CF_2O$— or —$CHFCF_2CF_2O$— and is composed of at least one repeating unit selected from —$CF_2CF_2CF_2O$—, —$CHFCF_2CF_2O$— and —$CH_2CF_2CF_2O$—, the total of the repeating units (degree of polymerization) being 2 to 200 (this polymer is described in Japanese Unexamined Patent Publication No. 202122/1985).

Specific examples thereof include:
$(CH_2CF_2CF_2O)_p$—$(CHFCF_2CF_2O)_q$ (p+q is 25 on an average, p:q=7:3, x number of units and y number of units may be arranged in a random order);
$(CF_2CF_2CF_2O)_q$—$(CHFCF_2CF_2O)_r$ (q+r is 25 on an average, p:r=5:1, x number of units and y number of units may be arranged in a random order);
$F(CF_2CF_2CF_2O)_nCF_2CF_3$ (n is 23 on an average);
$C_3F_7OCF(CF_3)CF_2O(CH_2CF_2CF_2O)_n$—$(CHFCF_2O)_m CHFCF_3$ (m+n is 7 on an average, m:n=1:4);

$C_3F_7OCF(CF_3)CF_2O(CH_2CF_2CF_2O)_nCF_2CF_3$ (n is 7 on an average);

$F(CF_2CF_2CF_2O)_2CF_2CF_3$;

$F(CF_2CF_2CF_2O)_nCF_2CF_3$ (n is 2.2 on an average);

$F(CF_2CF_2CF_2O)_nCF_2CF_3$ (n is 25 on an average);

(c) A polymer obtained by substituting part or all of the hydrogen atoms in the polymer (1) with chlorine atoms, wherein the main portion of the polymer (portion except for terminal groups) comprises repeating units represented by $-CCl_2CF_2CF_2O-$ or $-CHClCF_2CF_2O-$ and is composed of at least one repeating unit selected from $-CCl_2CF_2CF_2O-$, $-CHClCF_2CF_2O-$ and $-CH_2CF_2CF_2O-$, the total of the repeating units (degree of polymerization) being 2 to 200 (this polymer is described in Japanese Unexamined Patent Publication No. 113616/1986).

A polymer obtained by substituting part or all of the hydrogen atoms in the polymer (1) with fluorine atoms and chlorine atoms, wherein the main portion of the polymer (portion except for terminal groups) comprises repeating units represented by $-CF_2CF_2CF_2O-$, $-CFClCF_2CF_2O-$ or $-CHFCF_2CF_2O-$ and repeating units represented by $-CCl_2CF_2CF_2O-$ or $-CHClCF_2CF_2O-$ and is composed of at least one repeating unit selected from $-CF_2CF_2CF_2O-$, $-CFClCF_2CF_2O-$, $-CHFCF_2CF_2O-$, $-CCl_2CF_2CF_2O-$, $-CHClCF_2CF_2O-$ and $-CH_2CF_2CF_2O-$, the total of the repeating units (degree of polymerization) being 2 to 200 (this polymer is described in Japanese Unexamined Patent Publication No. 113616/1986).

Specific examples thereof include:

$F(CHClCF_2CF_2O)_nCHClCF_3$ (n is 5 on an average);

$F(CCl_2CF_2CF_2O)_nCCl_2CF_3$ (n is 5 on an average);

$F(CCl_2CF_2CF_2O)_nCCl_2CF_2Cl$ (n is 25 on an average);

$CCl_2FCF_2CF_2OCCl_2CF_2CF_2OCCl_2CF_3$;

$F(CCl_xF_yCF_2CF_2O)_nCCl_xF_yCF_3$ (n is 5 on an average, x+y=2, x:y=1:4);

$F(CF_2CF_2CF_2O)_x(CClFCF_2CF_2O)_y-CF_2CF_2COF$ (x+y is 20 on an average, x:y=2:1, x number of units and y number of units are arranged in a random order); and $F(CF_2CF_2CF_2O)_x(CClFCF_2CF_2O)_yCF_2CF_3$ (x+y is 20 on an average, x:y=2:1, x number of units and y number of units are arranged in a random order).

(d) A polymer whose main portion (portion except for terminal groups) is composed of repeating units of $-CF(CF_3)CF_2O-$, the total of the repeating units of hexafluoro-1,2-epoxypropane (degree of polymerization) being 10 to 100.

Specific examples thereof include:

$F[CF(CF_3)CF_2O]_nCHFCF_3$ (n is 50 on an average) (commercially available, for example, under the trade mark "Krytox 143AD").

(e) A polymer whose main portion (portion except for terminal groups) is composed of 4 to 50 repeating units of $-CF(CF_3)CF_2O-$ and 4 to 50 repeating units of $-CF_2O-$, the total of the repeated units of hexafluoro-1,2-epoxypropane and difluorocarbenoxy being 8 to 100.

Specific examples thereof include:

$F[CF(CF_3)CF_2O]_n(CF_2O)_nCF_3$ (n is 15 on an average, m is 6 on an average)(commercially available, for example, under the trade mark "Fomblin Y25").

(f) A polymer whose main portion (portion except for terminal groups) is composed of repeating units of $-CF_2CF_2O-$, the total of the repeated units of tetrafluoroethane (degree of polymerization) being 7 to 100.

Specific examples include:

$F(CF_2CF_2O)_nCF_3$ (n is 25 on an average).

II. Fluorochloroolefin telomers include, for example, the following compound (g).

(g) A telomer whose main portion (portion except for terminal groups) is composed of repeating units of $-CF_2CFCl-$, the total of the repeating units of chlorotrifluoroethane (degree of telomerization) being 3 to 20.

Specific examples thereof include:

$Cl(CF_2CFCl)_nCl$ (n is 6 on an average).

III. Fluoroolefin telomers include, for example, the following compound (h).

(h) A telomer whose main portion (portion other than terminal groups) is composed of 2 to 50 repeating units of $-CF_2CF_2-$, the total of the repeating units of tetrafluoroethylene (degree of telomerization) being 2 to 50.

Specific examples thereof include:

$H(CF_2CF_2)_nCF_3$ (n is 6 on an average), $[(CF_3)_2CF(CF_2)_n]_2$ (n is 3.5 on an average), and $Cl(CF_2CF_2)_nCHF_2$ (n is 6 on an average).

IV. Fluoroalkanes include, for example, the following compounds:

$(CF_3)_2CF(CF_2)_4CF(CF_3)_2$ (b.p. 207° C.),

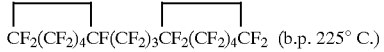
$CF_2(CF_2)_4CF(CF_2)_3CF_2(CF_2)_4CF_2$ (b.p. 225° C.)

(3) Polymer Prepared Using as a Monomer Component a Compound Having at Least one Fluorine-containing Group Selected from Polyfluoroalkyl Groups and Polyfluoroalkenyl Groups.

The polymer prepared using as a monomer component a compound having at least one fluorine-containing group selected from polyfluoroalkyl groups and polyfluoroalkenyl groups includes, for example, the following polymers:

(A) A copolymer of at least one fluorine-containing monomer selected from polyfluoroalkyl-containing (meth)acrylic esters, polyfluoroalkenyl-containing (meth)acrylic esters, polyfluoroalkyl-containing vinyl compounds and polyfluoroalkenyl-containing vinyl compounds, and another monomer copolymerizable therewith, the proportion of the fluorine-containing monomer being 20–95 parts by weight, preferably 30–90 parts by weight, based on 100 parts by weight of the total monomer component.

(B) A polymer of at least one fluorine-containing monomer selected from polyfluoroalkyl-containing epoxy monomers and polyfluoroalkenyl-containing epoxy monomers, or a copolymer of the fluorine-containing monomer and another monomer copolymerizable therewith, the proportion of the fluorine-containing monomer being 20–100 parts by weight, preferably 30–90 parts by weight, based on 100 parts by weight of the total monomer component.

The polymers (A) and (B) may be used singly or in combination of two or more.

The terms "polyfluoroalkyl" and "polyfluoroalkenyl" are used herein to refer to alkyl groups containing at least two fluorine atoms, and alkenyl groups containing at least two fluorine atoms, respectively. Preferably, each of the alkyl group and alkenyl group is a straight or branched chain group having 3 to 21 carbon atoms.

When the proportion of the fluorine-containing monomer in the copolymer (A) or (B) is lower than 20 parts by weight, it tends to be difficult to have high performance characteristics such as low surface energy, non-adhesion (mold releasability), water repellency and oil repellency.

First, the polymer (A) will be described below in detail.

Of the monomer components, polyfluoroalkyl-containing (meth)acrylic esters and polyfluoroalkenyl-containing (meth)acrylic esters include, for example, the following compounds:

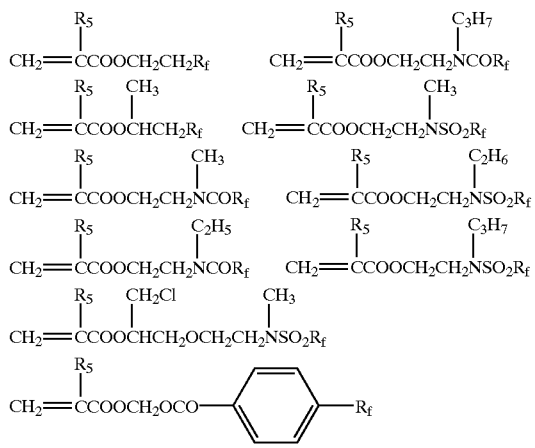

wherein $R_5$ is H or $CH_3$ and Rf is a straight or branched chain polyfluroalkyl or polyfluoroalkenyl group having 3 to 21 carbon atoms.

Specific examples include perfluorooctylethyl acrylate, 2-perflourooctyl-1-methylethyl acrylate, 2-(N-ethylperfluorooctasulfonamide)ethyl acrylate.

Polyfluoroalkyl-containing vinyl compounds and polyfluoroalkenyl-containing vinyl compounds include, for example, the following compounds:

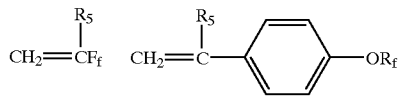

wherein $R_5$ and Rf are as defined above.

Specific examples include perfluorooctylethylene, perfluorooctyloxyphenyl ethylene and the like. The compounds may be used in combination of two or more.

Rf represents a straight or branched chain polyfluoroalkyl or polyfluoroalkenyl group having 3 to 21 carbon atoms, preferably 4 to 16 carbon atoms. Usually selected as Rf is a one having perfluoroalkyl in the terminal region. Also usable are those containing hydrogen or chlorine in the terminal region or those containing oxypolyfluoroalkylene.

Polyfluoroalkyl-free monomers or polyfluoroalkenyl-free monomers may be used in addition to at least one fluorine-containing monomer selected from polyfluoroalkyl-containing (meth)acrylic esters, polyfluoroalkenyl-containing (meth)acrylic esters, polyfluoroalkyl-containing vinyl compounds and polyfluoroalkenyl-containing vinyl compounds.

Examples of polyfluoroalkyl-free monomers and polyfluoroalkenyl-free monomers include compounds having a radically reactive unsaturated bond. Specific examples include methacrylic or acrylic acids and esters thereof represented by the formulas

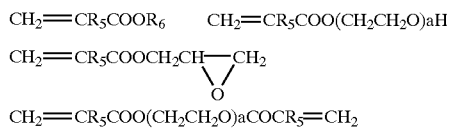

wherein $R_5$ is as defined above and $R_6$ is H or $C_bH_{2b+1}$ (wherein b is an integer of 1 to 23), and a is an integer of 1 to 30; for example, stearyl (meth)acrylate, 2-ethylhexyl (meth)acrylate, lauryl acrylate, polyethylene glycol mono(meth)acrylate, glycidyl (meth)acrylate, polyethyleneglycol di(meth)acrylate and the like.

Examples of polyfluoroalkyl-free monomers and polyfluoroalkenyl-free monomers further include monomers represented by the formulas

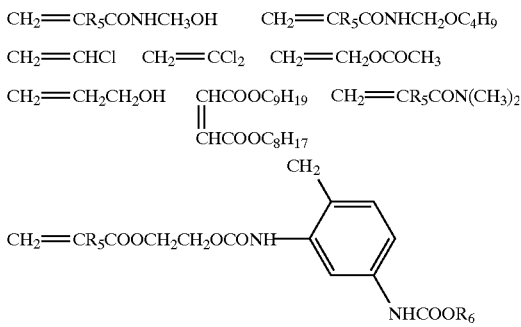

wherein $R_5$ and $R_6$ are as defined above. Specific examples include amide derivatives of (meth)acrylic acids; vinyl chloride, vinylidine chloride and like halogen-containing vinyl monomers; vinyl acetate, dialkyl esters of maleic acid and vinyl alcohols. Also usable are ethylene, vinylalkylether, maleic anhydride, styrene, α-methylstyrene, p-methylstyrene, acrylonitrile, butadiene, isoprene, chloroprene, methyl vinyl ketone, ester derivatives of (meth)acrylic acid containing —NHCOO—, and the like.

The polymer (A) can be prepared by solution polymerization or emulsion polymerization using the monomer component.

Preferably, the proportion of the monomer component is 0.5 to 50%, particularly 1.0 to 50%, further more preferably 5 to 45%, based on the total weight of the monomer component and polymerization solvent. When the proportion of the monomer component is lower than 0.5%, the yield of polymer obtained in each polymerization run will decrease, thus being economically disadvantageous. When the proportion is higher than 50%, the polymerization system tends to gel readily, whereby the continuation of the reaction becomes difficult.

The solution polymerization is carried out usually using a polymerization initiator, preferably at temperatures of 20° C. to 200° C., particularly 30° C. to 150° C., further more preferably 40° C. to 130° C., optionally using a pressurized vessel such as an autoclave. When the polymerization temperature is lower than 20° C., more monomers tend to remain unreacted. A polymerization temperature of higher than 200° C. raises the internal pressure of the autoclave too highly, whereby the manufacturing in such a device will be difficult. The reaction is usually carried out for about 1 to about 20 hours, preferably about 2 to about 15 hours, more preferably about 3 to about 10 hours, although the reaction time may vary depending on the reaction temperature.

Useful polymerization solvents include water and a wide variety of organic solvents. Preferred solvents are the above-mentioned halogen-containing solvents, particularly bromine-containing solvents.

Useful polymerization initiators include, for example, organic peroxides, azo compounds including azobis compounds, and persulfates. Also usable are ionizing radiations such as gamma-ray.

For example, when a vinyl compound is used as a monomer component, solution polymerization can be carried out by known methods for polymerization of vinyl compounds. The polymerization may be carried out, for example, in a vessel equipped with a stirrer and a means for heating or cooling from the outside. More specifically, solution polymerization can be carried out, for example, in the following manner.

A monomer component is added to a polymerization solvent in such an amount that the proportion of the monomer component is 0.5 to 50 wt. %, based on the total weight of the monomer component and the polymerization solvent. The solution containing the monomer component in the polymerization solvent is adjusted to a temperature of 40–150° C. and the polymerization is carried out in the presence of a polymerization initiator. When a vinyl compound is used as a monomer component, the polymerization initiator may be any known initiator for polymerization of unsaturated vinyl compounds. Usually used are peroxides and azo compounds that are readily soluble in solvents. Examples of peroxides include benzoyl peroxide, lauroyl peroxide and like acyl peroxides; t-butyl perbenzoate and like organic peresters; di-t-butyl peroxide and like dialkyl peroxides. Examples of azo compounds include azobis (isobutyronitrile) and azobis (2,4-dimethyl valeronitrile). The polymerization initiator is usually used in a proportion of about 0.1 to 2%, relative to the weight of the monomer component.

The molecular weight of the polymer may be controlled by adjustment of the initiator alone or other conditions. When the control achieved thereby is insufficient, a small amount of a chain transfer agent such as alkane($C_1$–$C_{12}$) thiol may be added.

Preferably, the polymer obtained has a number average molecular weight of 1,000 to 100,000, particularly, 5,000 to 70,000, further more preferably 10,000 to 50,000. When the molecular weight is less than 1,000, the polymer will have insufficient properties in respect of low surface energy, non-adhesion (mold releasability), water repellency and oil repellency. When the molecular weight is more than 100,000, it tends to be difficult to maintain good storage stability.

The polymer (B) will be described.

The polymer (B) includes, for example, homopolymers of a fluorine-containing compound represented by the formula

(wherein Rf is a $C_{3\text{-}21}$ straight or branched chain polyfluoroalkyl or polyfluoroalkenyl group, and c is an integer of 1 to 3); and copolymers of the fluorine-containing compound and a monomer copolymerizable therewith.

Specific examples of the fluorine-containing compounds of formula (7) are shown below.

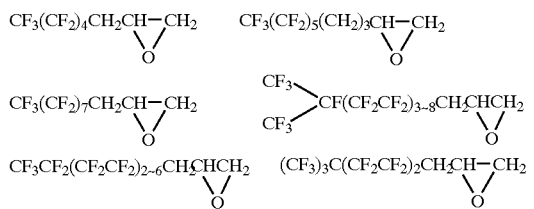

-continued

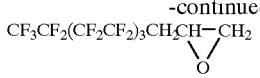

The monomer copolymerizable with the fluorine-containing compounds of formula (7) includes, for example, cyclic anhydrides, cyclic esters, cyclic ethers, cyclic formals, epoxides and the like.

The cyclic anhydride is a five-membered cyclic compound formed by removing water from two carboxyl groups which are linked to two carbon atoms adjacent to each other. Specific examples include succinic anhydride, maleic anhydride, phthalic anhydride, pyromellitic anhydride, 1,2-cyclohexanedicarboxylic anhydride, tetrahydrophthalic anhydride, 1,2,3,4-cyclopentane tetracarboxylic dianhydride, 1,2-cyclobutane dicarboxylic anhydride, endic anhydride, 1,2-naphthalene dicarboxylic anhydride, 2,3-naphthalene dicarboxylic anhydride, and substituted products thereof.

Specific examples of cyclic esters include β-propiolactone, γ-butyrolactone, δ-valerolactone, ε-caprolactone and perfluoro-γ-butyrolactone.

Specific examples of cyclic ethers include oxetane, tetrahydrofuran, tetrahydropyran, 3,3-bis(chloromethyl) oxetane and perfluorooxetane.

Specific examples of cyclic formals include 1,3-dioxolane, trioxane, tetraoxane, 1,3,6-trioxocan and 1,3,5-trioxocan.

Specific examples of epoxides include ethylene oxide, propylene oxide, epichlorohydrin, perfluoropropylene oxide, isobutylene oxide, butadiene oxide, styrene oxide, methyl glycidyl ether and allyl glycidyl ether.

A homopolymer of the fluorine-containing compound or a copolymer of the fluorine-containing compound and the above exemplified monomer can be prepared by conducting usual polymerization reactions under suitable reaction conditions. For example, solution polymerization methods or bulk polymerization methods can be used. The polymerization reaction is carried out using, as a polymerization initiator, a catalyst for promoting a ring opening polymerization of epoxy, such as a cationic polymerization catalyst or a coordinated anionic polymerization catalyst, in the presence or absence of a solvent. Examples of cationic polymerization catalysts include boron trifluoride, boron trifluoride complex, tin tetrachloride, $AlCl_3$, $BF_3(C_2H_5OH)_2$, metal halides, amines and the like. Examples of coordinated anionic polymerization catalysts include trialkylaluminum, dialkylzinc, phosphoric acid and the like. Useful solvents include trichlorotrifluoroethane, dimethylformamide, dimethoxyethane, n-hexane, ethers, ketones, cellosolves, carbitols and the like. The reaction temperature may be suitably selected in accordance with the reactivity of the starting monomer and is not particularly limited. It is usually preferable that the reaction temperature be in the range of about 0° C. to about 150° C.

In the case of producing a copolymer of the fluorine-containing compound of formula (7) and a monomer copolymerizable therewith, their proportions are not particularly limited and can be suitably selected. It is usually preferable that the fluorine-containing compound of formula (7) be used in a proportion of about 20 to about 100 parts by weight, based on 100 parts by weight of the total monomer component.

The polyether polymer or polyester polymer thus obtained is a transparent thermoplastic polymer. The resulting polymer usually has a glass transition point of about −10° C. to about 200° C., typically about 20° C. to about 100° C., although the glass transition point may vary depending on the kind and proportion of the monomer used. The polymer preferably has a number average molecular weight of about 2,000 to about 50,000, more preferably about 2,000 to 30,000.

In the below, (i) silicone compounds and (ii) waxes which are optionally used in the present invention will be described.

(i) Silicone Compound:

Examples of silicone compounds (i) include silicone oils, silicone resins, ladder polymers of organosilsesquioxanes. The compounds may be used singly or in combination of two or more.

Preferred silicone oils and silicone resins are, for example, usual polysiloxanes which are liquid or semi-solid at room temperature, or substituted polysiloxanes having a substituent such as $C_{1-5}$ alkyl, $C_{1-5}$ fluoroalkyl or phenyl. Generally speaking, compounds with low viscosity have a low friction coefficient, thus being preferred.

Examples of ladder polymers of organosilsesquioxanes are addition polymers of a hypothetical monomer represented by $R_7SiO_{1.5}$ (organosilsesquioxane), which have a ladder-shaped regular skeleton structure represented by the formula

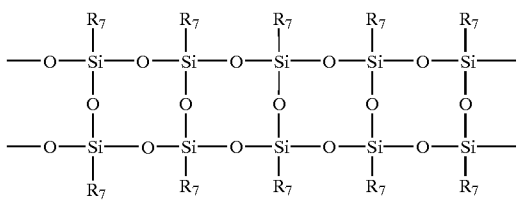

wherein $R_7$ is methyl or phenyl; part of the silicon atoms may be substituted by two hydroxyl groups provided, however, that the hydroxyl-disubstituted silicon atoms are not be very close to each other. In the case that two or more silicon atoms are substituted by two hydroxyl groups, it is preferable that at least one —O—Si—O— bond be interposed between the substituted silicon atoms. The ladder polymer is usually prepared by a method comprising hydrolyzing one ore more species selected from trifunctional organosilanes such as methyl trichlorosilane, phenyl trichlorosilane, methyl triethoxysilane, phenyl triethoxysilane and the like, followed by polycondensation and equilibration of the hydrolysis product, optionally further followed by polycondensation.

Strictly defined, the ladder polymer of organosilsesquioxane is a polymer formed by chainwise or cyclic linking of one or more species selected from organosilsesquioxane oligomers represented by the formula

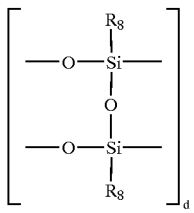

wherein the $R_8$s are the same substituent and represent hydrogen, $C_{1-6}$ alkyl, cyclohexyl, $C_{2-6}$ alkenyl or phenyl, and d is an integer of 2 to 6). The degree of polymerization of the ladder polymer is about 2 to about 200, based on a repeating unit of

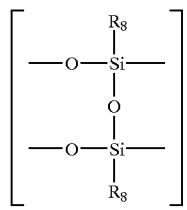

Ten percent or less of silicon atoms may be substituted by two hydroxyl groups but the substituted silicon atoms should not be very close to each other. When the ladder polymer is a chain polymer, halogen atom such as chlorine, $C_{1-6}$ alkoxy, acetoxy or hydroxyl is bonded to terminal silicon atom. At the O-terminal, correspondingly to the Si-terminal, oxygen atom is substituted by halogen atom, or $C_{1-6}$ alkyl group, acetoxy group or hydrogen atom is bonded.

Ladder polymers of organosilsesquioxane are known and can be prepared in accordance with the methods described in Encyclopedia of Polymer Science and Technology, Vol.12, pp.500–501, 1970, Japanese Examined Patent Publication No. 15989/1965, Japanese Unexamined Patent Publication No. 5826/1981, etc. The ladder polymers useful in the present invention are not limited to those prepared by such methods.

Specific examples of organosilsesquioxanes are shown below.

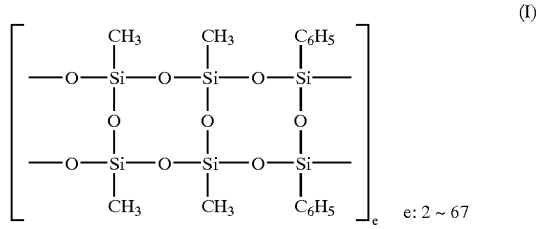

wherein the methyl to phenyl ratio is 2:1 and these groups are not necessarily at the positions shown above.

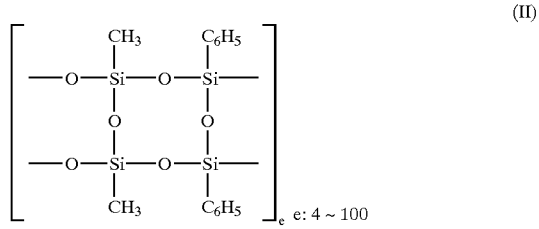

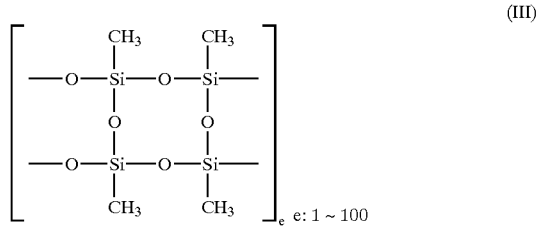

-continued

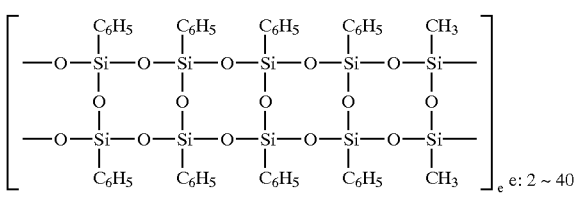

wherein the methyl to phenyl ratio is 1:4 and these groups are not necessarily at the positions shown above.

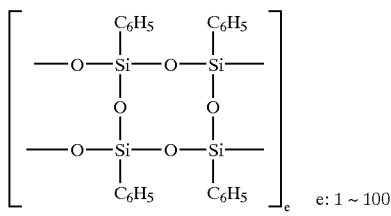

The above compounds (I), (II), (III), (IV) and (V) are commercially available under the trademarks "GR100", "GR150", "GR650", "GR908" and "GR950" respectively (manufactured by Owens-Illinois Closure Inc., U.S.A.).

(ii) Wax

Waxes (ii) usable in the present invention are waxes in a broad sense, including not only vegetable or animal waxes used from old times but also mineral or synthetic waxes such as paraffin waxes. Examples of waxes include vegetable waxes of fatty acid esters such as carnauba wax and candela wax; mineral waxes such as polyethylene wax, microcrystalline wax and FT wax; animal waxes such as wool wax and beewax; and so on. The waxes may be used singly or in combination of two or more.

The surface treatment composition of the present invention is formed by dissolving the above-mentioned surface treatment component in a solvent component. If necessary, rust-preventive agents, antistatic agents, antibacterial agents, fungicides and the like may be added in accordance with the intended purpose.

The surface treatment composition of the present invention is a surface treatment agent used for purposes other than a water-repellent and an oil-repellent. The surface treatment composition finds applications, for example, as mold release agents applied to a metal mold for resin or rubber molding; resin adhesion inhibitors for lead wires of condensers or the like; flux barrier agents; anti-adhesion agents applied to various substrates such as metals, resins, rubbers, cloths, paper, wood, glass, metal oxide and pottery; antiblocking agents; rear surface treatment agents; antitacking agents; electric wire stripping agents; and lubricants. The composition is particularly suitable for mold release agents, resin adhesion inhibitors and anti-adhesion agents.

The method of using the surface treatment composition of the invention is not particularly limited. A suitable method can be selected in accordance with the article to be treated, etc. The desired surface treatment can be carried out, for example, by a method comprising immersing the article in the surface treatment composition, followed by drying, or a method comprising coating the surface of the article with the surface treatment composition, followed by drying.

The surface treatment composition of the invention may be used, for example, in the form of an aerosol containing a propellant. Preferred propellants include $C_{1-2}$ fluoroalkane, $C_{1-2}$ chlorofluoroalkane, LPG gas, dimethylether, nitrogen gas, carbon dioxide gas and the like. Typical examples of $C_{1-2}$ fluoroalkane and $C_{1-2}$ chlorofluoroalkane are dichlorodifluoromethane, trichlorotrifluoromethane, chlorodifluoromethane, chlorodifluoroethane, dichlorotrifluoroethane, tetrafluoroethane, and mixtures of at least two of these compounds. The propellent is preferably used in an amount that is between 0.05 and 2 times the total weight of the surface treatment composition including the solvent.

When used as an aerosol, the surface treatment composition and the propellant are usually contained in "a container having a mechanism for ejecting a liquid from the container". Examples of such "containers having a mechanism for ejecting a liquid from the container" include aerosol containers, spray containers and the like.

The fluorine-containing surface treatment composition of the invention is a surface treatment agent that is extremely unlikely to cause ozone layer depletion and global warming, the composition having excellent storage stability and excellent performance characteristics as a surface treatment agent and being highly safe due to the non-flammability or flame retardancy thereof.

BEST MODE FOR CARRYING OUT THE INVENTION

In the below, the present invention is explained in details with referring to Examples. The present invention, however, is not limited to these Examples. Hereinafter, all parts and percentages are by weight.

EXAMPLE

Components of Surface Treatment Composition Used in Example

Solvent Component:

(1) The 8 types of solvents shown below in Table 1 were used as a halogen-containing solvent.

TABLE 1

| Type | Trade name | Structure | ODP | GWP (100 years) | KB value | Boiling point (° C.) | Inflammability |
|---|---|---|---|---|---|---|---|
| Nanofluorobutyl-methyl ether | HFE-7100 (manufactured by 3M) | $C_4H_9$—O—$CH_3$ | 0 | 500 | 10 | 60 | Nonflammable |
| Nanofluorobutyl-ethyl ether | HFE-7200 (manufactured by 3M) | $C_4H_9$—O—$C_2H_5$ | 0 | 100 | 10 | 78 | Nonflammable |
| 1-Bromopropane | ABZOL VG (manufactured byTOSOH) | $BrCH_2CH_2CH$ | 0.021 | 0.3 | 125 | 71 | Nonflammable |
| HFC-4310mee | | $C_5H_2F_{10}$ | 0 | 1300 | 5 | 55 | Nonflammable |

TABLE 1-continued

| Type | Trade name | Structure | ODP | GWP (100 years) | KB value | Boiling point (° C.) | Inflammability |
|---|---|---|---|---|---|---|---|
| Perfluorohexane | | $C_6F_{14}$ | 0 | 6800 | — | 56 | Nonflammable |
| HCFC-225ca/cb | | $C_3F_5ClH_2$ | 0.03 | 170/530 | 31 | 53.8 | Nonflammable |
| HCFC-141b | | $C_2FH_3Cl_2$ | 0.11 | 630 | 56 | 32.1 | Nonflammable |
| CFC-113 | | $C_2F_3Cl_3$ | 0.8 | 5000 | 31 | 47.6 | Nonflammable |

KB value is for indicting the solubility of a diluent in lacquer and paint industry, i.e., the amount (cc) of a diluent required to precipitate kauri gum from 20 g of a standard kauri gum-butanol solution (American Gum Importors' Inc.) at 25° C. The higher this value is, the higher the solubility of the diluent is.

(2) Auxiliary Solvent:

5 types of solvents, namely toluene, xylene, isooctane, methyl isobutyl ketone (MIBK) and 1-bromopropane were used.

Surface Treatment Component (a) Phosphorus-containing compound having at least one fluorine-containing group selected from polyfluoroalkyl group and polyfluoroalkenyl group (phosphoric esters, phosphoric acid derivatives, phosphinic acid derivatives and their salts):

The 7 types of compounds shown below in Table 2 were used.

TABLE 2

| | Compound | |
|---|---|---|
| No. | Type of Compound | Composition |
| (1)-a | $CF_3CF_2(CF_2CF_2)_nCH_2CH(OH)CH_2O\text{—}\overset{O}{\underset{\parallel}{P}}\text{—}(OH)_2$ | 100 mol % |
| (1)-b | $CF_3CF_2(CF_2CF_2)_nCH_2CH(OH)CH_2O\text{—}\overset{O}{\underset{\parallel}{P}}\text{—}(OH)_2$ | 31 mol % |
| | $[CF_3CF_2(CF_2CF_2)_nCH_2CH(OH)CH_2O]_2\text{—}\overset{O}{\underset{\parallel}{P}}\text{—}(OH)$ | 69 mol % |
| (1)-c | $CF_3CF_2(CF_2CF_2)_nCH_2CH(OH)CH_2O\text{—}\overset{O}{\underset{\parallel}{P}}\text{—}(OH)(ONH_4)$ | 100 mol % |
| (1)-d | $(CF_3)_2CF(CF_2CF_2)_mCH_2CH(OH)CH_2O\text{—}\overset{O}{\underset{\parallel}{P}}\text{—}(OH)_2$ | 100 mol % |
| (1)-e | $(CF_3)_2CF(CF_2CF_2)_mCH_2CH(OH)CH_2O\text{—}\overset{O}{\underset{\parallel}{P}}\text{—}(OH)_2$ | 43 mol % |
| | $[(CF_3)_2CF(CF_2CF_2)_mCH_2CH(OH)CH_2O]_2\text{—}\overset{O}{\underset{\parallel}{P}}\text{—}(OH)$ | 57 mol % |
| (1)-f | $(CF_3)_2CF(CF_2CF_2)_mCH_2CH(OH)CH_2O\text{—}\overset{O}{\underset{\parallel}{P}}\text{—}(OH)(ONH_4)$ | 100 mol % |
| (1)-g | $C_9F_{17}O\text{—}\langle\text{C}_6\text{H}_4\rangle\text{—}CH_2\text{—}\overset{O}{\underset{\parallel}{P}}\text{—}(OH)(OC_2H_5)$ | 100 mol % |

In this Example, as (1)-a to (1)-c are used the compounds in which n=3 to 8 and the average number of n is 3.45. As (1)-d to (1)-f are used the compounds in which m=3 to 7 and the average number of m is 3.62.

(b) Highly fluorinated organic compound:
The 4 types of compounds shown below in Table 3 were used.

TABLE 3

| No. | Type of compound |
|---|---|
| (2)-a | $Cl(CF_2CFCl)_{3-12}Cl$ |
| (2)-b | $F(CF_2CF_2CF_2O)_aCF_2CF_3$, a ≈ 26 |
| (2)-c | $F(CFCF_2O)_bCHFCF_3$, b ≑ 30, with $CF_3$ branch |
| (2)-d | $F(CFCF_2O)_c(CF_2O)_dCF_3$, c ≑ 25, d ≑ 10, with $CF_3$ branch |

(c) Polymer prepared using as a monomer component a compound having at least one fluorine-containing group selected from polyfluoroalkyl group and polyfluoroalkenyl group:
The 9 types of compounds shown below in Table 4 are used as monomer components to produce polymers by the following procedure.

In Table 4, as to (3)-a to (3)-d and (3)-i, in a stainless-steel autoclave equipped with a stirrer and a heating device were placed monomer components shown in Table 4 in the specified amount (parts by weight), 500 parts of 1-bromopropane as a polymerization solvent and 1 part of t-butyl peroxypivalate as a polymerization initiator. The mixture was allowed to react for 10 hours with stirring in a nitrogen atmosphere at 70° C. The mixture was then cooled to 20° C. to stop the reaction. This polymerized solution was taken out from the autoclave. 500 parts of methanol was added to the solution, and copolymers precipitated in the solution was separated by filtration. The copolymers were dried at 60° C. for 12 hours, giving copolymers.

As to (3)-e to (3)-g, in a stainless-steel autoclave equipped with a stirrer and a heating device were placed the monomer components shown in Table 4 in the amount (parts by weight) specified in the same Table, 500 parts of nanofluorobutyl-methyl ether as a polymerization solvent and 1 part of boron trifluoride ethylate as a polymerization initiator. The mixture was allowed to react for 5 hours with stirring in a nitrogen atmosphere at 30° C. Then, water was added to the mixture to stop the reaction. After this polymerized solution was taken out from the autoclave, 500 parts of methanol was added to the polymerized solution. Precipitated polymers in the solution were separated by filtration. The polymers were dried at 60° C. for 12 hours, giving polymers.

As to (3)-h, in a stainless-steel autoclave equipped with a stirrer and a heating device were placed the monomer components shown in Table 4 in the amount (parts by weight) specified in the same Table and 0.5 part of N,N-dimethylbenzylamine as a polymerization initiator. The mixture was allowed to react for 8 hours with stirring in a nitrogen atmosphere at 140° C. Then, the mixture was cooled to 20° C. to stop the reaction, giving polymers.

TABLE 4

| No. | Type of monomer | Composition |
|---|---|---|
| (3)-a | $CH_2=CHCOOCH_2CH_2C_8F_{17}$ | 70 parts |
|  | $CH_2=CHCOOC_{18}H_{37}$ | 30 parts |
| (3)-b | $CH_2=CHCOOCH_2CH_2C_8F_{17}$ | 70 parts |
|  | $CH_2=CHCOOCH_2CH(C_2H_5)C_4H_9$ | 30 parts |
| (3)-c | $CH_2=CHCOOCH_2CH_2C_8F_{17}$ | 70 parts |
|  | $CH_2=CHCOOC_{12}H_2$ | 30 parts |
| (3)-d | $CH_2=CHCOOCH_2CH_2C_8F_{17}$ | 70 parts |
|  | $CH_2=CHCOOC_{18}H_{37}$ | 25 parts |

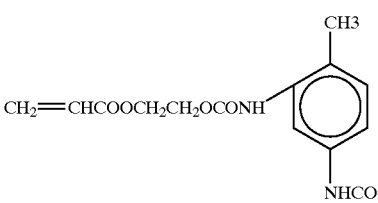

TABLE 4-continued

| | Monomer | |
|---|---|---|
| No. | Type of monomer | Composition |
| (3)-h | $C_2F_5C(CF_2CF_2)_mCH_2$—CH—CH$_2$ \\ O, m = 3.6 \\ Phthalic anhydride | 85 parts \\ 15 parts |
| (3)-i | $CH_2$=$CHCOOCH_2CH_2C_8F_{17}$ \\ $CH_2CHCOOC_{18}H_{37}$ | 10 parts \\ 90 parts |

(d) Silicone compound:

The 3 types of compounds shown below in Table 5 were used.

TABLE 5

| No. | Compound |
|---|---|
| (i)-a | Silicone oil SH200 (1000CS) (produced by Dow Corning Toray Silicone Co., Ltd.) |
| (i)-b | Silicone oil SH7020 (produced by Dow Corning Toray Silicone Co., Ltd.) |
| (i)-c | 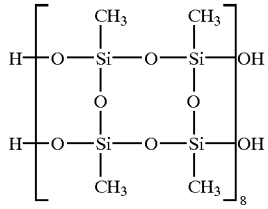 |

The 2 types of compounds shown below in Table 6 were used.

TABLE 6

| No. | Type of compound |
|---|---|
| (ii)-a | Paraffin wax-140 (produced by Nippon Seiro Company, Limited) |
| (ii)-b | Carnauba wax |

Preparation of Surface Treatment Composition

The solvent components shown below in Tables 7 and 8 and the surface treatment components shown below in Table 9 and 10 were mixed. The mixtures were stirred at room temperature for 10 minutes, giving surface treatment compositions.

TABLE 7

| | Main solvent | | | Auxiliary solvent | | |
|---|---|---|---|---|---|---|
| | | Proportion (%) | | | Proportion (%) | |
| Test No. | Type | In solvent component | In composition | Type | In solvent component | In composition |
| Ex. 1 | Nanofluorobutyl-methyl ether | 100% | 99.0% | — | — | — |
| Ex. 2 | Nanofluorobutyl-methyl ether | 100% | 98.5% | — | — | — |
| Ex. 3 | Nanofluorobutyl-methyl ether | 100% | 98.0% | — | — | — |
| Ex. 4 | Nanofluorobutyl-methyl ether | 70% | 68.4% | Isooctane | 30% | 29.3% |
| Ex. 5 | Nanofluorobutyl-methyl ether | 100% | 99.3% | — | — | — |
| Ex. 6 | Nanofluorobutyl-ethyl ether | 100% | 99.3% | — | — | — |
| Ex. 7 | Nanofluorobutyl-methyl ether | 100% | 99.3% | — | — | — |
| Ex. 8 | Nanofluorobutyl-methyl ether | 100% | 98.5% | — | — | — |
| Ex. 9 | Nanofluorobutyl-methyl ether | 80% | 78.5% | Toluene | 20% | 19.6% |
| Ex. 10 | Nanofluorobutyl-methyl ether | 80% | 78.7% | Xylene | 20% | 19.7% |
| Ex. 11 | Nanofluorobutyl-methyl ether | 80% | 79.4% | Isooctane | 20% | 19.8% |
| Ex. 12 | Nanofluorobutyl-methyl ether | 50% | 49.3% | MIBK | 50% | 49.3% |
| Ex. 13 | Nanofluorobutyl-methyl ether | 50% | 49.3% | 1-Bromopropane | 50% | 49.3% |
| Ex. 14 | Nanofluorobutyl-methyl ether | 100% | 99.0% | — | — | — |
| Ex. 15 | Nanofluorobutyl-methyl ether | 100% | 99.0% | — | — | — |
| Ex. 16 | Nanofluorobutyl-methyl ether | 100% | 95.0% | — | — | — |
| Ex. 17 | Nanofluorobutyl-methyl ether | 100% | 95.0% | — | — | — |
| Ex. 18 | Nanofluorobutyl-methyl ether | 80% | 77.6% | Isooctane | 20% | 19.4% |
| Ex. 19 | 1-Bromopropane | 100% | 99.0% | — | — | — |
| Ex. 20 | 1-Bromopropane | 100% | 98.0% | — | — | — |

TABLE 8

| Test No. | Main solvent | | | Auxiliary solvent | | |
|---|---|---|---|---|---|---|
| | | Proportion (%) | | | Proportion (%) | |
| | Type | In solvent component | In composition | Type | In solvent component | In composition |
| Ex. 21 | 1-Bromopropane | 100% | 98.0% | — | — | — |
| Ex. 22 | 1-Bromopropane | 100% | 98.0% | — | — | — |
| Ex. 23 | 1-Bromopropane | 100% | 98.6% | — | — | — |
| Ex. 24 | 1-Bromopropane | 80% | 79.0% | Isooctane | 20% | 19.8% |
| Ex. 25 | 1-Bromopropane | 100% | 99.0% | — | — | — |
| Ex. 26 | 1-Bromopropane | 100% | 99.0% | — | — | — |
| Ex. 27 | 1-Bromopropane | 100% | 99.0% | — | — | — |
| Ex. 28 | 1-Bromopropane | 100% | 99.0% | — | — | — |
| Ex. 29 | 1-Bromopropane | 100% | 99.0% | — | — | — |
| Ex. 30 | 1-Bromopropane | 100% | 99.0% | — | — | — |
| Ex. 31 | 1-Bromopropane | 100% | 98.0% | — | — | — |
| Comp. Ex. 1 | HFC-4310mee | 100% | 99.0% | — | — | — |
| Comp. Ex. 2 | Perfluorohexane | 100% | 98.0% | — | — | — |
| Comp. Ex. 3 | HCFC-225ca/cb | 100% | 99.0% | — | — | — |
| Comp. Ex. 4 | HCFC-141b | 100% | 99.0% | — | — | — |
| Comp. Ex. 5 | CFC-113 | 100% | 98.0% | — | — | — |
| Comp. Ex. 6 | Nanofluorobutyl-methyl ether | 100% | 96.9% | — | — | — |
| Comp. Ex. 7 | Nanofluorobutyl-methyl ether | 100% | 97.0% | — | — | — |
| Comp. Ex. 8 | Nanofluorobutyl-methyl ether | 100% | 99.0% | — | — | — |
| Comp. Ex. 9 | 1-Bromopropane | 100% | 96.9% | — | — | — |
| Comp. Ex. 10 | 1-Bromopropane | 100% | 99.0% | — | — | — |

TABLE 9

| Test No. | Component (1) | | | Component (2) | | | Component (3) | | |
|---|---|---|---|---|---|---|---|---|---|
| | | Proportion (%) | | | Proportion (%) | | | Proportion (%) | |
| | Type No. | In active ingredient | In composition | Type No. | In active ingredient | In composition | Type No. | In active ingredient | In composition |
| Ex. 1 | (1)-a | 100% | 1.0% | | | | | | |
| Ex. 2 | (1)-b | 67% | 1.0% | (2)-a | 33% | 0.5% | | | |
| Ex. 3 | (1)-b | 75% | 1.5% | (2)-b | 25% | 0.5% | | | |
| Ex. 4 | (1)-b | 43% | 1.0% | (2)-c | 22% | 0.5% | | | |
| Ex. 5 | (1)-c | 100% | 0.7% | | | | | | |
| Ex. 6 | (1)-d | 100% | 0.7% | | | | | | |
| Ex. 7 | (1)-e | 100% | 0.7% | | | | | | |
| Ex. 8 | (1)-e | 40% | 0.6% | (2)-a | 60% | 0.9% | | | |
| Ex. 9 | (1)-e | 32% | 0.6% | | | | | | |
| Ex. 10 | (1)-e | 38% | 0.6% | | | | | | |
| Ex. 11 | (1)-e | 75% | 0.6% | | | | | | |
| Ex. 12 | (1)-e | 42% | 0.6% | (2)-d | 21% | 0.3% | | | |
| Ex. 13 | (1)-e | 40% | 0.6% | | | | | | |
| Ex. 14 | (1)-f | 100% | 1.0% | | | | | | |
| Ex. 15 | (1)-g | 100% | 1.0% | | | | | | |
| Ex. 16 | | | | (2)-a | 100% | 5.0% | | | |
| Ex. 17 | | | | (2)-b | 100% | 5.0% | | | |
| Ex. 18 | | | | (2)-c | 67% | 2.0% | | | |
| Ex. 19 | | | | | | | (3)-a | 100% | 1.0% |
| Ex. 20 | | | | | | | (3)-b | 100% | 2.0% |

TABLE 9-continued

| Test No. | Component (i) Type No. | Component (i) Proportion (%) In active ingredient | Component (i) Proportion (%) In composition | Component (ii) Type No. | Component (ii) Proportion (%) In active ingredient | Component (ii) Proportion (%) In composition |
| --- | --- | --- | --- | --- | --- | --- |
| Ex. 1 | | | | | | |
| Ex. 2 | | | | | | |
| Ex. 3 | | | | | | |
| Ex. 4 | (i)-a | 22% | 0.5% | (ii)-a | 13% | 0.3% |
| Ex. 5 | | | | | | |
| Ex. 6 | | | | | | |
| Ex. 7 | | | | | | |
| Ex. 8 | | | | | | |
| Ex. 9 | (i)-a | 52% | 1.0% | (ii)-b | 16% | 0.3% |
| Ex. 10 | (i)-b | 62% | 1.0% | | | |
| Ex. 11 | (i)-c | 25% | 0.2% | | | |
| Ex. 12 | (i)-a | 36% | 0.5% | | | |
| Ex. 13 | (i)-c | 60% | 0.9% | | | |
| Ex. 14 | | | | | | |
| Ex. 15 | | | | | | |
| Ex. 16 | | | | | | |
| Ex. 17 | | | | | | |
| Ex. 18 | (i)-a | 33% | 1.0% | | | |
| Ex. 19 | | | | | | |
| Ex. 20 | | | | | | |

TABLE 10

| Test No. | Component (1) Type No. | Component (1) Proportion (%) In active ingredient | Component (1) Proportion (%) In composition | Component (2) Type No. | Component (2) Proportion (%) In active ingredient | Component (2) Proportion (%) In composition | Component (3) Type No. | Component (3) Proportion (%) In active ingredient | Component (3) Proportion (%) In composition |
| --- | --- | --- | --- | --- | --- | --- | --- | --- | --- |
| Ex. 21 | | | | (2)-a | 50% | 1.0% | (3)-b | 50% | 1.0% |
| Ex. 22 | | | | | | | (3)-b | 50% | 1.0% |
| Ex. 23 | | | | | | | (3)-b | 71% | 1.0% |
| Ex. 24 | | | | | | | (3)-b | 83% | 1.0% |
| Ex. 25 | | | | | | | (3)-c | 100% | 1.0% |
| Ex. 26 | | | | | | | (3)-d | 100% | 1.0% |
| Ex. 27 | | | | | | | (3)-e | 100% | 1.0% |
| Ex. 28 | | | | | | | (3)-f | 100% | 1.0% |
| Ex. 29 | | | | | | | (3)-g | 100% | 1.0% |
| Ex. 30 | | | | | | | (3)-h | 100% | 1.0% |
| Ex. 31 | | | | | | | (3)-h | 50% | 1.0% |
| Comp. Ex. 1 | (1)-b | 100% | 1.0% | | | | | | |
| Comp. Ex. 2 | (1)-b | 50 | 1.0% | | | | | | |
| Comp. Ex. 3 | (1)-b | 100% | 1.0% | | | | | | |
| Comp. Ex. 4 | (1)-b | 100% | 1.0% | | | | | | |
| Comp. Ex. 5 | (1)-b | 50% | 1.0% | | | | | | |
| Comp. Ex. 6 | (1)-b | 3% | 0.1% | | | | | | |
| Comp. Ex. 7 | | | | | | | | | |
| Comp. Ex. 8 | | | | | | | | | |
| Comp. Ex. 9 | | | | | | | (3)-b | 3% | 0.1% |
| Comp. Ex. 10 | | | | | | | (3)-i | 100% | 1.0% |

TABLE 10-continued

| Test No. | Component (i) Type No. | Component (i) Proportion (%) In active ingredient | Component (i) Proportion (%) In composition | Component (ii) Type No. | Component (ii) Proportion (%) In active ingredient | Component (ii) Proportion (%) In composition |
|---|---|---|---|---|---|---|
| Ex. 21 | | | | | | |
| Ex. 22 | (i)-a | 50% | 1.0% | | | |
| Ex. 23 | (i)-b | 29% | 0.4% | | | |
| Ex. 24 | (i)-c | 17% | 0.2% | | | |
| Ex. 25 | | | | | | |
| Ex. 26 | | | | | | |
| Ex. 27 | | | | | | |
| Ex. 28 | | | | | | |
| Ex. 29 | | | | | | |
| Ex. 30 | | | | | | |
| Ex. 31 | (i)-a | 50% | 1.0% | | | |
| Comp. Ex. 1 | | | | | | |
| Comp. Ex. 2 | (i)-a | 50% | 1.0% | | | |
| Comp. Ex. 3 | | | | | | |
| Comp. Ex. 4 | | | | | | |
| Comp. Ex. 5 | (i)-a | 50% | 1.0% | | | |
| Comp. Ex. 6 | (i)-a | 97% | 3.0% | | | |
| Comp. Ex. 7 | (i)-a | 100% | 3.0% | | | |
| Comp. Ex. 8 | | | | (ii)-a | 100% | 1.0% |
| Comp. Ex. 9 | (i)-a | 97% | 3.0% | | | |
| Comp. Ex. 10 | | | | | | |

Method and Results of Test

The tests of Test Examples 1–8 shown below were carried out using the above surface treatment compositions. The results are shown below in Tables 11–14.

Test Example 1

Mold Release Test with Semi-rigid Urethane Foam (A) Composition of semi-rigid urethane foam

| Solution A | |
|---|---|
| Sumisen 3900 (polyol) | 90 parts |
| Water (foaming agent) | 1.6 parts |
| Triethanolamine (catalyst) | 3 parts |
| Triethylamine (catalyst) | 0.5 part |
| Kaorizer (foam stabilizer) | 0.5 part |
| Solution B | |
| Sumijule 44V20 (isocyanate) | 41.3 parts |

(B) Test Method

The surface treatment compositions were each applied to an aluminum mold (6 cm×3 cm), and air-dried at room temperature for 1 hour. The solutions A and B of the above semi-rigid urethane foam were mixed with each other under agitation at 5000 rpm for 10 seconds, whereupon the resulting mixture was poured in the aluminum mold. After allowing to harden at room temperature for 10 minutes, the specimen thus prepared was tested for tensile strength with a tensile tester (drawing speed: 200 mm/min) to determine the mold releasability from the adhesive strength.

Test Example 2

Mold Release Test with Epoxy Resin (A) Composition of Epoxy Resin

| Solution A | |
|---|---|
| Epikote #828 (produced by Shell Chemical Co., Ltd.) | 100 parts |
| Solution B | |
| Triethylenetetramine | 10 parts |

(B) Test Method

The surface treatment compositions were each applied by brushing to an aluminum mold (10 cm×10 cm) and air-dried. Then the epoxy resin solutions A and B were well mixed with each other. A glass fiber cloth (chopstrand mat produced by Nitto-Spinning Co.) of 10 cm×10 cm impregnated with the resulting solution was placed into the mold. Then the epoxy resin was hardened by standing at room temperature of 25° C. for a day. The specimen thus prepared was tested for 90° peeling strength with use of a tension tester (drawing speed: 20 mm/min) to determine the mold releasability. After single application of a surface treatment composition, the lifetime of the surface treatment composition was determined by repeating the cycle of the placing the epoxy resin and releasing, without further application of the surface treatment composition, until the mold releasability decreased down. Thus, the lifetime was determined as the number of the molded articles released in a complete form.

Test Example 3

Mold Release Test with Fluorine Resin

| (A) Composition of fluorine rubber | |
| --- | --- |
| DAIEL G901 (produced by Daikin Industries, Ltd.) | 100 parts |
| MT carbon black (produced by R. T. Vanderbilt Co. Inc.) | 20 parts |
| Perhexa 2.5B (produced by NOF Corporation) | 1.5 parts |
| Triallyl isocyanurate (produced by Nippon Kasei Chemical Company Limited) | 4 parts |
| (B) Vulcanizing conditions | |
| Vulcanizing pressure | 35 kg/cm$^2$G |
| Vulcanizing temperature | 160° C. |
| Vulcanizing time | 10 minutes |

(C) Test Method

The surface treatment compositions were each applied by brushing to a non-plated steel mold at ordinary temperature and air-dried. Vulcanization for molding was carried out using the mold, thereby producing 20 rubber plates (40 mm in diameter and 2 mm in thickness). The mold releasability was rated on the following scale.

○: The rubber plates are spontaneously released from the mold or can be easily taken out from the mold by the hand.

Δ: The rubber plates can be taken out from the mold with force.

X: The rubber plates are difficult to be taken out from the mold, or the rubber plates are adhered to the mold and can not be taken out.

The lifetime of the mold releasability was determined by applying the surface treatment compositions each once and then repeating the cycle of vulcanization for molding of a fluorine rubber and taking out the molded rubber from the mold, without further application of the surface treatment compositions, until the mold releasability decreased down. Thus, the lifetime was determined as the number of the molded articles released in a complete form.

Test Example 4

Non-adhesiveness Test

The surface treatment compositions were each applied on one side of a standard test sheet (2 mm (thickness)×30 mm×100 mm) of soft polyvinyl chloride (produced by TAKAFUJI KASEI KK) uniformly by brushing in an amount of 60 mg as solid weight. The sheet was dried by a dryer at 100° C. for 3 minutes and left to stand at room temperature. On the treated side of this sheet was superposed another test sheet to prepare a test piece. This test piece was pressed using a pressing machine at a temperature of 100° C. and a pressure of 20 kg/cm$^2$ for 30 seconds.

The pressed test piece was left to stand at 25° C. for 1 hour, and was split by the hand to rate the non-adhesiveness of the test piece on the following scale.

○: The test piece spontaneously separates or can be split easily by the hand.

Δ: The test piece can be split with force.

X: The test piece is difficult to be split or can not be split because the sheets are adhered to each other.

Test Example 5

Peel Test with Adhesive Tape

The surface treatment compositions were each applied on an aluminum mold (10 cm×10 cm) by brushing and air-dried. A cellophane adhesive tape of 18 mm in width and 10 cm in length as specified in JIS Z 1522 was adhered to the mold, while part of the tape was left unadhered for 3 cm in length. The adhesive tape was then tested for 90° peeling strength with a tensile tester (drawing speed: 50 mm/sec). From the average value of 90° peeling strength, the peelability of the adhesive tape was rated on the following scale.

○: Peeling strength is 200 g or lower

Δ: Peeling strength is higher than 200 g but not higher than 350 g.

X: Peeling strength is higher than 350 g.

Test Example 6

Electric Wire Strippability Test

A copper wire was covered with a 1-mm thick polyvinyl chloride resin at 170° C. using an extrusion molding machine to form an insulating layer 1. Then, on the surface of the insulating layer 1 was applied a surface treatment composition with a sponge soaked in the surface treatment composition. The resulting wire was further covered with a 0.5-mm thick polyvinyl chloride resin at 170° C. by an extrusion molding machine to form an insulating layer 2. The insulating layer 2 of the wire was stripped with a nipper of which cutting edges are provided with notches. The strippability of the layer 2 was rated on the following scale.

○: The insulating layer 2 can be smoothly stripped and no elongation of the insulating layer 1 is found.

Δ: The insulating layer 2 can be stripped, but the elongation of the insulating layer 1 is found.

X: The insulating layer 2 can not be stripped, or is difficult to be stripped from the insulating layer 1.

Test Example 7

Friction Test

The surface treatment compositions were each applied on an aluminum plate (10 cm×20 cm) by brushing and air-dried to prepare a test piece. A steel ball with a load of 200 g was moved back and forth on the test piece at a speed of 12 cm/min. at room temperature, and the coefficient of friction $\mu$ was determined.

TABLE 11

| Test No. | Test Ex. 1 Mold releasability (g/cm²) | Test Ex. 2 Mold releasability (g/cm²) | Lifetime of mold releasability (time) | Test Ex. 3 Mold releasability (Scale: ○△x) | Lifetime of mold releasability (time) | Test Ex. 4 Non-adhesiveness (Scale: ○△x) | Test Ex. 5 Peelability (Scale: ○△x) |
|---|---|---|---|---|---|---|---|
| Ex. 1  | 42 | 17 | 4 | ○ | 4 | ○ | ○ |
| Ex. 2  | 30 | 23 | 5 | △ | 2 | ○ | ○ |
| Ex. 3  | 34 | 21 | 5 | ○ | 3 | ○ | ○ |
| Ex. 4  | 35 | 31 | 3 | ○ | 3 | △ | △ |
| Ex. 5  | 52 | 19 | 5 | ○ | 4 | ○ | ○ |
| Ex. 6  | 39 | 24 | 4 | ○ | 4 | ○ | ○ |
| Ex. 7  | 43 | 23 | 4 | ○ | 3 | ○ | △ |
| Ex. 8  | 33 | 18 | 5 | △ | 3 | ○ | ○ |
| Ex. 9  | 38 | 38 | 4 | ○ | 4 | △ | ○ |
| Ex. 10 | 50 | 41 | 3 | ○ | 4 | ○ | ○ |
| Ex. 11 | 55 | 35 | 6 | ○ | 5 | ○ | ○ |
| Ex. 12 | 37 | 33 | 3 | △ | 3 | ○ | ○ |
| Ex. 13 | 47 | 39 | 5 | ○ | 4 | ○ | ○ |
| Ex. 14 | 44 | 23 | 4 | ○ | 3 | ○ | ○ |
| Ex. 15 | 43 | 22 | 4 | ○ | 3 | ○ | △ |
| Ex. 16 | 85 | 42 | 3 | △ | 2 | ○ | ○ |
| Ex. 17 | 66 | 39 | 3 | △ | 3 | ○ | ○ |
| Ex. 18 | 72 | 40 | 3 | △ | 3 | ○ | ○ |
| Ex. 19 | 51 | 21 | 5 | ○ | 3 | ○ | △ |
| Ex. 20 | 49 | 19 | 6 | ○ | 4 | ○ | ○ |

TABLE 12

| Test No. | Test Ex. 6 Electric wire strippability (scale: ○△X) | Test Ex. 7 Coefficient of friction μ | Disadvantage description | Overall evaluation (scale: ○△X) |
|---|---|---|---|---|
| Ex. 1  | △ | 0.023 | — | ○ |
| Ex. 2  | ○ | 0.019 | — | ○ |
| Ex. 3  | ○ | 0.015 | — | ○ |
| Ex. 4  | △ | 0.011 | — | ○ |
| Ex. 5  | ○ | 0.022 | — | ○ |
| Ex. 6  | △ | 0.025 | — | ○ |
| Ex. 7  | △ | 0.030 | — | ○ |
| Ex. 8  | ○ | 0.020 | — | ○ |
| Ex. 9  | ○ | 0.022 | — | ○ |
| Ex. 10 | ○ | 0.025 | — | ○ |
| Ex. 11 | ○ | 0.023 | — | ○ |
| Ex. 12 | ○ | 0.019 | — | ○ |
| Ex. 13 | ○ | 0.025 | — | ○ |
| Ex. 14 | △ | 0.027 | — | ○ |
| Ex. 15 | △ | 0.026 | — | ○ |
| Ex. 16 | ○ | 0.021 | — | ○ |
| Ex. 17 | ○ | 0.020 | — | ○ |
| Ex. 18 | ○ | 0.022 | — | ○ |
| Ex. 19 | △ | 0.030 | — | ○ |
| Ex. 20 | ○ | 0.031 | — | ○ |

TABLE 13

| Test No. | Test Ex. 1 Mold releasability (g/cm²) | Test Ex. 2 Mold releasability (g/cm²) | Lifetime of mold releasability (time) | Test Ex. 3 Mold releasability (Scale: ○△x) | Lifetime of mold releasability (time) | Test Ex. 4 Non-adhesiveness (Scale: ○△x) | Test Ex. 5 Peelability (Scale: ○△x) |
|---|---|---|---|---|---|---|---|
| Ex. 21 | 31 | 21 | 5 | △ | 3 | ○ | ○ |
| Ex. 22 | 52 | 39 | 4 | ○ | 3 | ○ | ○ |
| Ex. 23 | 57 | 33 | 4 | ○ | 4 | ○ | ○ |
| Ex. 24 | 62 | 28 | 5 | ○ | 4 | ○ | ○ |
| Ex. 25 | 56 | 23 | 7 | ○ | 4 | ○ | ○ |
| Ex. 26 | 52 | 24 | 5 | △ | 3 | ○ | △ |
| Ex. 27 | 41 | 20 | 6 | ○ | 4 | ○ | ○ |
| Ex. 28 | 44 | 24 | 4 | ○ | 4 | ○ | ○ |
| Ex. 29 | 50 | 29 | 3 | ○ | 4 | ○ | △ |
| Ex. 30 | 38 | 25 | 5 | ○ | 3 | ○ | ○ |
| Ex. 31 | 46 | 30 | 4 | △ | 3 | ○ | ○ |

TABLE 13-continued

| Test No. | Test Ex. 1 Mold releasability (g/cm²) | Test Ex. 2 Mold releasability (g/cm²) | Test Ex. 2 Lifetime of mold releasability (time) | Test Ex. 3 Mold releasability (Scale: o∆x) | Test Ex. 3 Lifetime of mold releasability (time) | Test Ex. 4 Non-adhesiveness (Scale: o∆x) | Test Ex. 5 Peelability (Scale: o∆x) |
|---|---|---|---|---|---|---|---|
| Comp. Ex. 1 | Adhered | Adhered | — | x | — | ∆ | ∆ |
| Comp. Ex. 2 | Adhered | Adhered | — | x | — | x | o |
| Comp. Ex. 3 | 35 | 23 | 6 | o | 5 | o | o |
| Comp. Ex. 4 | 40 | 22 | 3 | o | 4 | o | o |
| Comp. Ex. 5 | 37 | 38 | 5 | ∆ | 3 | o | o |
| Comp. Ex. 6 | 230 | 130 | 1 | x | — | o | o |
| Comp. Ex. 7 | Adhered | 210 | 1 | ∆ | 2 | o | o |
| Comp. Ex. 8 | 121 | Adhered | — | x | — | x | ∆ |
| Comp. Ex. 9 | 157 | 102 | 1 | ∆ | 1 | o | o |
| Comp. Ex. 10 | 193 | 99 | 1 | x | — | x | x |

TABLE 14

| Test No. | Test Ex. 6 Electric wire strippability (scale: o∆x) | Test Ex. 7 Coefficient of friction μ | Disadvantage description | Overall evaluation (scale: o∆x) |
|---|---|---|---|---|
| Ex. 21 | o | 0.021 | — | o |
| Ex. 22 | ∆ | 0.020 | — | o |
| Ex. 23 | ∆ | 0.022 | — | o |
| Ex. 24 | o | 0.024 | — | o |
| Ex. 25 | ∆ | 0.032 | — | o |
| Ex. 26 | ∆ | 0.034 | — | o |
| Ex. 27 | o | 0.031 | — | o |
| Ex. 28 | o | 0.029 | — | o |
| Ex. 29 | ∆ | 0.033 | — | o |
| Ex. 30 | o | 0.032 | — | o |
| Ex. 31 | o | 0.025 | — | o |
| Comp. Ex. 1 | x | 0.041 | Low performance since uniform film not formed because of insolubility of component (1) High GWP of solvent | x |
| Comp. Ex. 2 | ∆ | 0.023 | Low performance since uniform film not formed because of insolubility of component (1) High GWP of solvent | x |
| Comp. Ex. 3 | ∆ | 0.030 | High GWP of solvent | ∆ |
| Comp. Ex. 4 | ∆ | 0.034 | High ODP and GWP of solvent | ∆ |
| Comp. Ex. 5 | 0 | 0.022 | High ODP and GWP of solvent (banning of CFC) | x |
| Comp. Ex. 6 | 0 | 0.020 | Low performance because of low content of component (1) (3%) | x |
| Comp. Ex. 7 | 0 | 0.020 | Low performance because of absence of component (1), (2) and (3) | x |
| Comp. Ex. 8 | x | 0.056 | Low performance because of absence of component (1), (2) and (3) | x |
| Comp. Ex. 9 | ∆ | 0.023 | Low performance because of low content of component (3) (3%) | x |
| Comp. Ex. 10 | x | 0.050 | Low performance because of low content (10 parts) of fluorine-containing monomer in component (3) | x |

What is claimed is:

1. A fluorine-containing surface treatment composition comprising a surface treatment component and a solvent component and adapted for use as a mold release agent, an electric wire stripping agent or a lubricant, wherein
(I) the surface treatment component comprises at least one species selected from the group consisting of: (1) phosphorus-containing compounds having at least one fluorine-containing group selected from the group consisting of polyfluoroalkyl groups and polyfluoroalkenyl groups; (2) highly fluorinated organic compounds; and (3) polymers prepared using, as a monomer component, a compound having at least one fluorine-containing group selected from the group consisting of polyfluoroalkyl groups and polyfluoroalkenyl groups,
said highly fluorinated organic compound (2) being at least one compound selected from the group consisting of:
(A) at least one fluoroalkane selected from the group consisting of
$(CF_3)_2CF(CF_2)_4CF(CF_3)_2$ and

$CF_2(CF_2)_4CF(CF_2)_3CF_2(CF_2)_4CF_2$ (b.p. 225° C.)

(B) at least one fluorochloro polyether selected from the group consisting of:

F(CHClCF$_2$CF$_2$O)$_n$CHClCF$_3$ (n is 5 on an average);
F(CCl$_2$CF$_2$CF$_2$O)$_n$CCl$_2$CF$_3$ (n is 5 on an average);
F(CCl$_2$CF$_2$CF$_2$O)$_n$CCl$_2$CF$_2$Cl (n is 25 on an average);
CCl$_2$FCF$_2$CF$_2$OCCl$_2$CF$_2$CF$_2$OCCl$_2$CF$_3$;
F(CCl$_x$F$_y$CF$_2$CF$_2$O)$_n$CCl$_x$F$_y$CF$_3$ (n is 5 on an average), x+y=2, x:y=1:4);
F(CF$_2$CF$_2$CF$_2$O)$_x$(CClFCF$_2$CF$_2$O)$_y$—CF$_2$CF$_2$COF (x+y is 20 on an average, x:y=2:1, x number of units and y number of units are arranged in a random order); and
F(CF$_2$CF$_2$CF$_2$O)$_x$(CClFCF$_2$CF$_2$O)$_y$CF$_2$CF$_3$ (x+y is 20 on an average, x:y=2:1, x number of units and y number of units are arranged in a random order), and (C) fluorochloroolefin telomers whose main portion, defined as a portion except for terminal groups, is composed of repeating units of —CF$_2$CFCl—, the total of the repeating units of chlorotrifluoroethane in terms of degree of telomerization being 3 to 20, and said polymer (3) prepared using as, a monomer component, a compound having at least one fluorine-containing group selected from the group consisting of polyfluoroalkyl groups and polyfluoroalkenyl groups being at least one polymer selected from the group consisting of:

(A) a copolymer of at least one fluorine-containing monomer selected from the group consisting of polyfluoroalkyl-containing (meth)acrylic esters, polyfluoroalkenyl-containing (meth)acrylic esters, polyfluoroalkyl-containing vinyl compounds and poly-fluoroalkenyl-containing vinyl compounds, and another monomer copolymerizable therewith, the proportion of the fluorine-containing monomer being 20–95 parts by weight, based on 100 parts by weight of the total monomer component, and (B) a polymer of at least one fluorine-containing monomer selected from the group consisting of polyfluoroalkyl-containing epoxy monomers and polyfluoroalkenyl-containing epoxy monomers, or a copolymer of the fluorine-containing monomer and another monomer copolymerizable therewith, the proportion of the fluorine-containing monomer being 20–100 parts by weight, based on 100 parts by weight of the total monomer component; and (II) the solvent component contains 5 wt. % or more of a chlorine-free, non-flammable halogen-containing solvent which has an ozone depletion potential (ODP) of 0.03 or less, a 100-year integrated global warming potential (GWP) value of 500 or less, and a kauri butanol (KB) value of 5 or more.

2. The fluorine-containing surface treatment composition according to claim 1, wherein the halogen containing solvent has a boiling point of 0° C. to 150° C.

3. The fluorine-containing surface treatment composition according to claim 1 wherein
the surface treatment component contains 5 wt. % or more of at least one component selected from the group consisting of
(1) phosphorus-containing compounds having at least one fluorine-containing group selected from the group consisting of polyfluoroalkyl groups and polyfluoroalkenyl groups and
(2) highly fluorinated organic compounds, and the solvent component contains 50 wt. % or more of hydrofluoroether.

4. The fluorine-containing surface treatment composition according to claim 3 wherein the surface treatment component comprises:
at least one component selected from the group consisting of
(1) phosphorus-containing compounds having at least one fluorine-containing group selected from the group consisting of polyfluoroalkyl groups and polyfluoroalkenyl groups and
(2) highly fluorinated organic compounds; and
at least one component selected from the group consisting of (i) silicone compounds and (ii) waxes.

5. The fluorine-containing surface treatment composition according to claim 4 wherein the solvent component comprises hydrofluoroether and at least one solvent selected from the group consisting of aromatic solvents, petroleum solvents, ketone solvents and bromine-containing solvents.

6. The fluorine-containing surface treatment composition according to claim 5 wherein
the surface treatment component contains 30–95 wt. % of at least one component selected from the group consisting of (1) phosphorus-containing compounds having at least one fluorine-containing group selected from the group consisting of polyfluoroalkyl groups and polyfluoroalkenyl groups and (2) highly fluorinated organic compounds and 70–5 wt. % of at least one component selected from the group consisting of (i) silicone compounds and (ii) waxes; and
the solvent component contains 50–90 wt. % of hydrofluoroether and 10–50 wt. % of at least one solvent selected from the group consisting of aromatic solvents, petroleum solvents, ketone solvents and bromine-containing solvents.

7. The fluorine-containing surface treatment composition according to claim 1 wherein
the surface treatment component contains 5 wt. % or more of (3) a polymer prepared using as a monomer components a compound having at least one fluorine-containing group selected from the group consisting of polyfluoroalkyl groups and polyfluoroalkenyl groups; and
the solvent component contains 50 wt. % or more of a bromine-containing solvent.

8. The surface treatment composition according to claim 7 wherein the surface treatment component comprises:
(3) a polymer prepared using as a monomer component a compound having at least one fluorine-containing group selected from the group consisting of polyfluoroalkyl groups and polyfluoroalkenyl groups; and
at least one component selected from the group consisting of (2) highly fluorinated organic compounds, (i) silicone compounds and (ii) waxes.

9. The surface treatment composition according to claim 8 wherein the surface treatment component contains:
30–95 wt. % of (3) a polymer prepared using as a monomer component a compound having at least one fluorine-containing group selected from the group consisting of polyfluoroalkyl groups and polyfluoroalkenyl groups; and
70–5 wt. % of at least one component selected from the group consisting of (2) highly fluorinated organic compounds, (i) silicone compounds and (ii) waxes.

10. The surface treatment composition according to claim 7 wherein the bromine-containing solvent is a $C_{1-3}$ halogenated hydrocarbon having at least one bromine atom.

11. The surface treatment composition according to claim 7 wherein the bromine-containing solvent is at least one compound selected from the group consisting of 1-bromopropane, 2-bromopropane and 1,2-dibromopropane.

12. A product to be used for surface treatment comprising a container having a mechanism for ejecting a liquid from the container, the container containing the surface treatment composition according to claim 1.

13. The product according to claim 12 wherein the container is an aerosol container.

14. A surface treated article obtained by surface-treating an article with the surface treatment composition according to claim 1.

15. A process for surface treatment of an article to be treated, which comprises treating the article with the surface treatment composition according to claim 1 followed by drying.

* * * * *